United States Patent

Fitzpatrick et al.

[15] 3,645,149
[45] Feb. 29, 1972

[54] CONTROL FOR AUTOMATIC TRANSMISSION

[72] Inventors: John D. Fitzpatrick, Warren; Harold L. Sharp, Farmington; Bernard Burns, Warren, all of Mich.

[73] Assignee: General Motors Corporation, Detroit, Mich.

[22] Filed: Apr. 30, 1970

[21] Appl. No.: 33,262

[52] U.S. Cl. .................................................... 74/473 R
[51] Int. Cl. .................................................... G05g 9/00
[58] Field of Search .................... 74/473 R, 475, 476, 477

[56] References Cited

UNITED STATES PATENTS

| | | | |
|---|---|---|---|
| 2,569,341 | 9/1951 | Schjolin | 74/473 X |
| 3,088,329 | 5/1963 | Merritt | 74/473 |
| 2,964,964 | 12/1960 | Craig | 74/473 |

*Primary Examiner*—Milton Kaufman
*Attorney*—W. E. Finken, A. M. Heiter and Charles R. White

[57] ABSTRACT

Automatic transmission control in which the manual control level is supported by a mounting assembly for limited turning movement in a longitudinal direction about an axis beneath the vehicle floor adjacent to the transmission to effect a change in transmission operation. The mounting assembly includes a lever carrier that is drivingly connected to a rotatable mounting shaft extending through the sides of a protective support bracket suspending from a floor-mounted baseplate. The lever is also pivotally mounted on the carrier for limited lateral movement to permit disengagement of the lever from positive stops corresponding to different transmission operations. A torque-transmitting lever connected directly to the control-lever-operated mounting shaft is drivingly connected by a linkage to the transmission.

5 Claims, 4 Drawing Figures

PATENTED FEB 29 1972

INVENTORS
John D. Fitzpatrick,
Harold L. Sharp, &
BY Bernard Burns
Charles L. White
ATTORNEY

PATENTED FEB 29 1972 3,645,149

INVENTORS
John D. Fitzpatrick,
Harold L. Sharp, &
BY Bernard Burns

Charles R. White
ATTORNEY

CONTROL FOR AUTOMATIC TRANSMISSION

This invention relates to transmission controls and more particularly to a manual control for an automatic transmission having an improved control lever support and connecting assembly for mounting the lever to the vehicle floor and for operatively connecting the lever to the transmission.

Floor-mounted automatic transmission controls used in many modern vehicles are usually located on the floor convenient to the driver and often in a console on the transmission and propeller shaft tunnel. These controls effectively utilize space above the tunnel and have been satisfactory but often have involved complicated and costly mechanisms which therefore are not generally desirable for employment on economy-type vehicles. In such vehicles it is desirable to have a highly reliable and uncomplicated transmission control which facilitates manufacture as well as repair or replacement if needed.

In this invention there is a manually operated transmission control lever supported on a carrier member which is fixed to a mounting or pivot shaft located adjacent to the transmission. The pivot shaft is mounted inside a protective boxlike support suspended from a floor-mounted baseplate. One end of the pivot shaft extends from one side of this support and carries a force-transmitting lever operatively connected to the transmission by suitable linkage for transmission control purposes; the other end of the pivot shaft extends from the support and has screw threads for a nut that retains the lever and its carrier member on the support. The control lever is mounted for limited transverse turning movement by a pivot connecting the lever to the carrier member so that the lever can be moved from engagement with positive stops on a base-supported detent plate. The carrier member also supports a biasing spring, which urges the lever into engagement with one side of the detent plate having the stops but which allows the transverse pivotal movement of the lever from engagement with the positive stops so that the manual lever can be subsequently turned to change transmission operation. The operating lever carrier member also supports a bracket that has a cover plate secured thereto which covers the detent plate and prevents the entry of foreign matter into the control assembly while providing a finished appearance to a transmission control console secured to the baseplate.

It is an object and feature of this invention to provide a new and improved transmission control in which a pivotal mounting shaft connects a manual lever carrier to a support bracket and drivingly connects the manual lever and carrier to a force-transmitting mechanism operatively connected to an automatic transmission.

Another object of this invention is to provide a new and improved transmission control in which the control lever carrier construction connects the lever to a torque-transmitting shaft for limited rotation therewith and in which the control lever is pivotally mounted on the carrier for limited turning movement transverse to the turning movement permitted by the shaft.

Another object of this invention is to provide a new and improved automatic transmission control including a transmission control lever which is pivotally mounted beneath the vehicle floor with components including the pivot completely sealed and protected from environmental conditions outside of the vehicle body.

Another object of this invention is to provide a new and improved automatic transmission control having: a base mounted on the transmission and propeller shaft tunnel which includes a downwardly extending support bracket; a torque-transmitting pivot shaft extending through opposing sides of the support bracket, a lever carrier fixed to the pivot shaft and to a manually operable lever mounted on the carrier for limited turning movement with respect to the carrier; and connecting means operatively connecting the torque-transmitting pivot shaft with automatic transmission controls.

These and other objects of the invention will become more apparent from the following detailed description and drawings in which.

Figure 1:
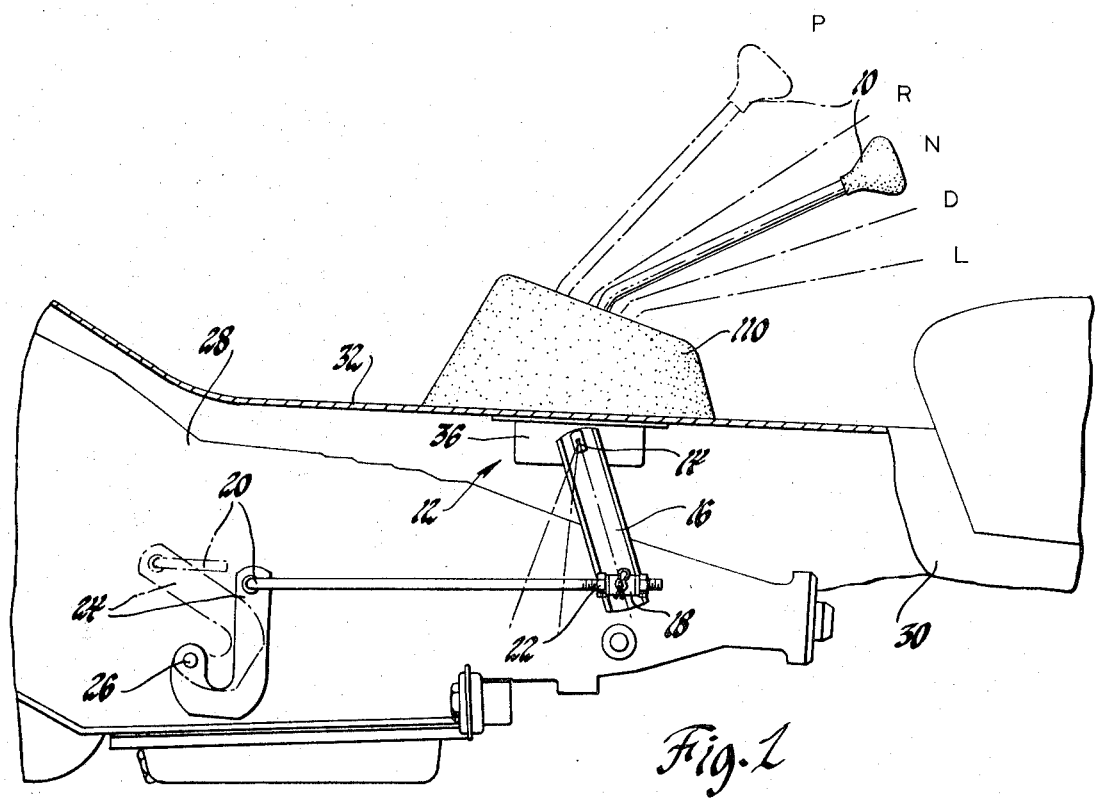
FIG. 1 is a side elevational view of a transmission control and an automatic transmission.

As shown in FIG. 1 there is a hand-operated transmission control shift lever 10 operatively disposed in the interior of a vehicle and mounted by a support assembly 12 for limited pivotal movement with respect to pivot axis 14 beneath the vehicle floor. The control shift lever 10 is drivingly connected to an outer lever 16 which is turned with respect to pivot axis 14 in response to corresponding rotary movement of control lever 10. The outer end of lever 16 is operatively connected by a swivel 18 to one end of selector rod 20. This end of the rod has screw threads to receive adjusting nuts 22 on either side of the head of the swivel. The other end of the selector rod is pivotally connected to a movable selector arm 24 which is secured to a shaft 26 mounted on transmission 28. This shaft is operatively connected to conventional automatic transmission controls such as a selector valve not shown.

The vehicle has a floor formed with a tunnel 30 to accommodate transmission 28; the tunnel has a top portion 32 with an opening 34 through which a boxlike shift-lever mounting bracket 36 projects. This bracket has an open upper side with a peripheral flange 38 and is secured to a generally rectangular baseplate 40 which completely covers opening 34 and is fastened to the floor by screws 42.

The bracket has spaced sidewalls 44 having aligned, circular openings for receiving a cylindrical torque-transmitting and supporting shaft 46 which projects through the sidewalls 44. One end of shaft 46 is securely attached to the outer lever 16. The shaft 46 is retained on the bracket 36 by suitable washers and a nut 48 threaded onto the projecting end of the shaft. Antifriction sleeve bearings 50 of nylon or other suitable material are employed between shaft 46 and the walls forming the openings in the sidewalls. Washers 52 are disposed between the lever 16 and sidewall 44 to eliminate longitudinal play of shaft 46 after installation in bracket 36.

Figure 2:
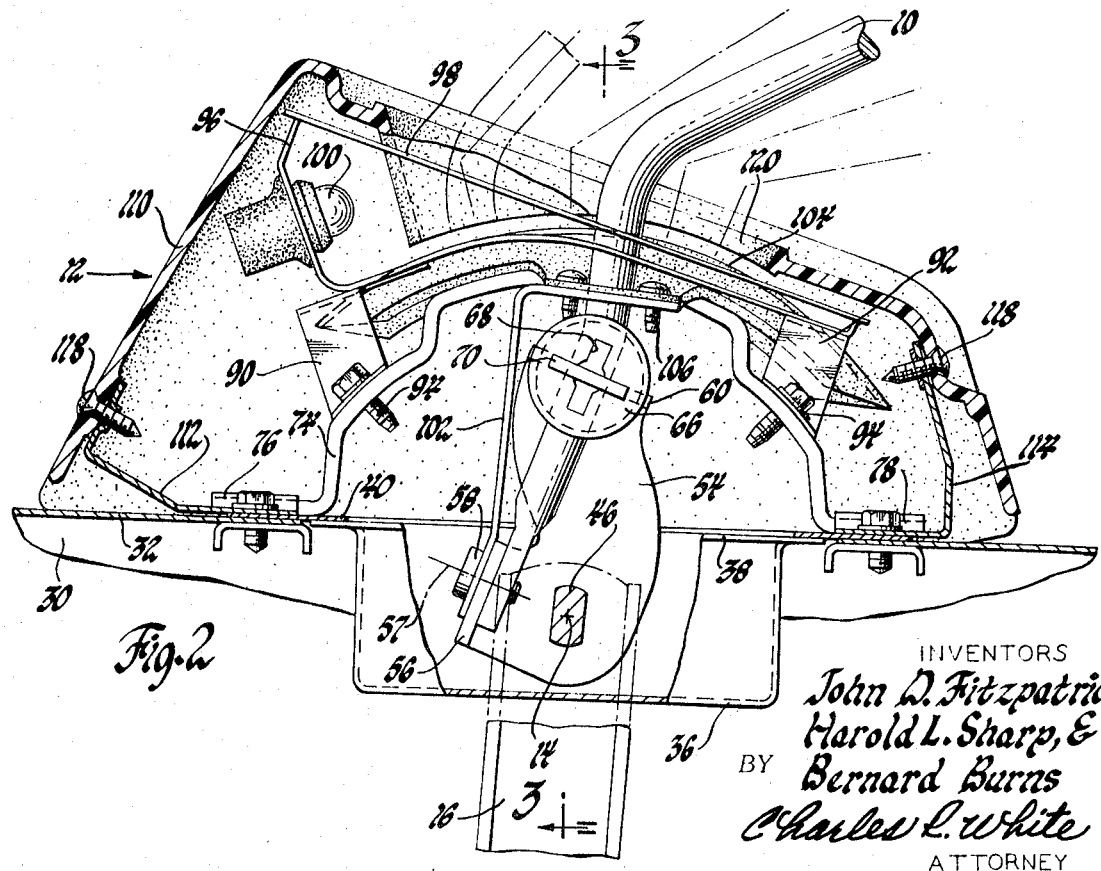
FIG. 2 is a side view of the transmission control similar to FIG. 1 but with parts in section and is also a view taken along line 2—2 of FIG. 3.

A shift lever carrier or bracket 54 is secured to shaft 46 for movement therewith and a suitable cylindrical spacer 55 is disposed on a reduced portion of shaft 46 between bracket 54 and sleeve 50. As shown in FIG. 2, the lower portion of bracket 54 is keyed to shaft 46 and is formed with a lower laterally extending flange 56. A pivot pin 58 extending through flange 56 and the lower portion of control shift lever 10 mounts the lever to bracket 54 for limited pivotal movement about an axis 57 transverse to axis 14 adjacent to the transmission.

Figure 3:
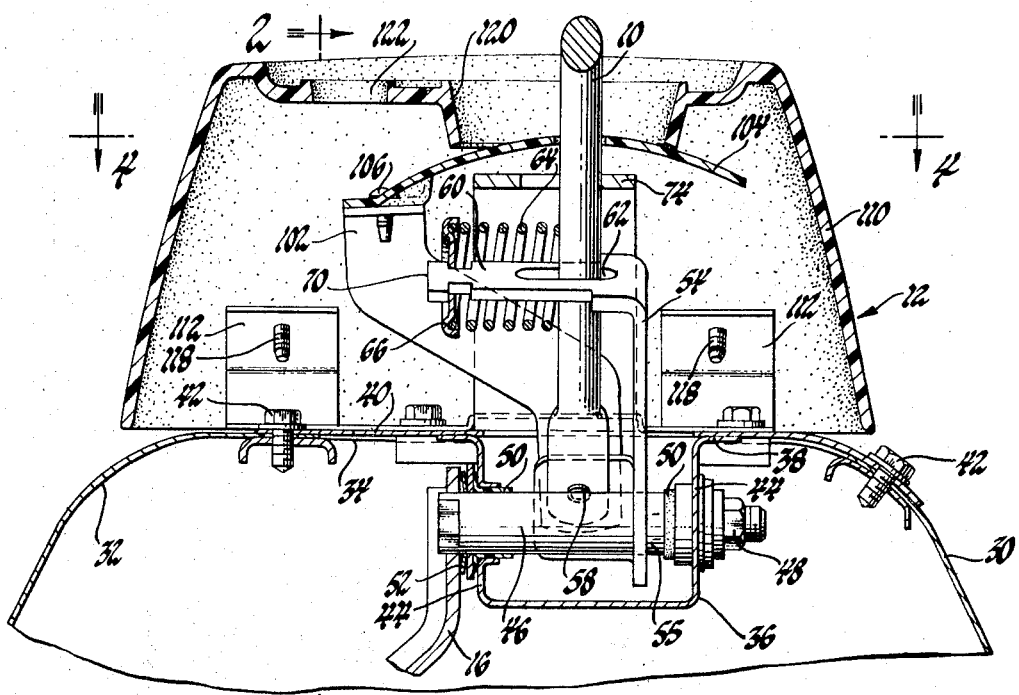
FIG. 3 is a view of the transmission control taken along line 3—3 of FIG. 2.
Figure 4:
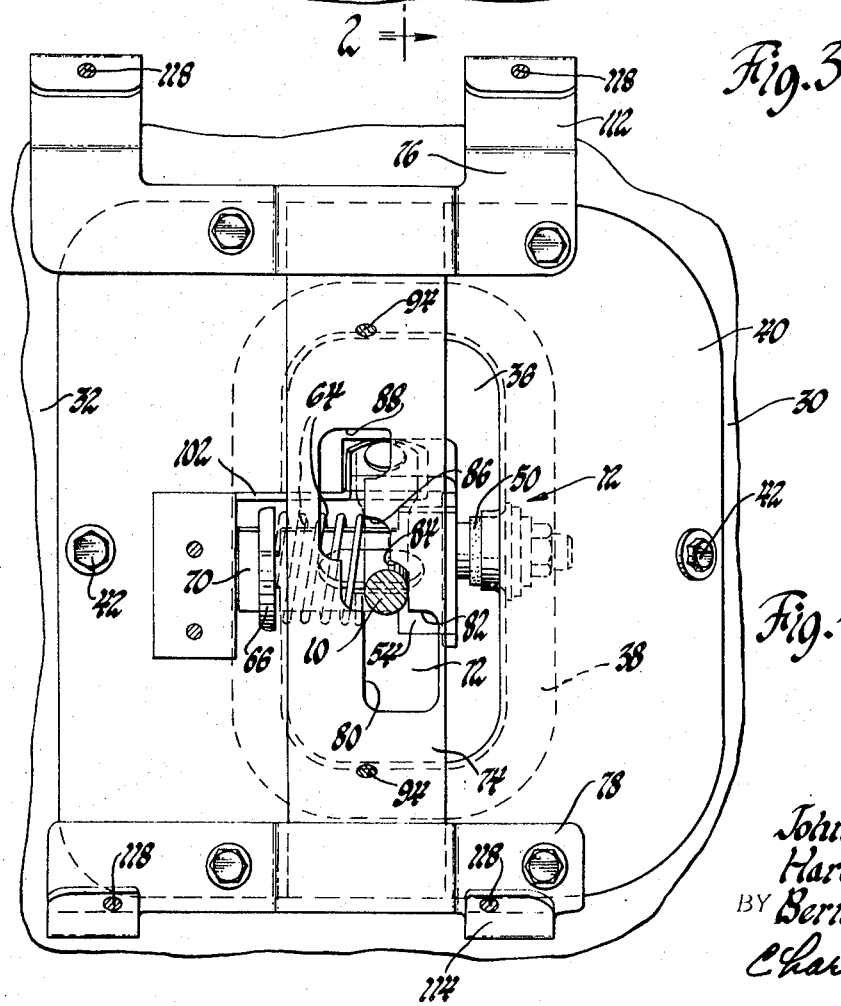
FIG. 4 is a view taken generally along the line 4—4 of FIG. 3.

Bracket 54 also has an upper laterally extending flange 60 having an elongated and laterally extending slot 62 formed therein through which control shift lever 10 extends. A coil spring 64 encircling the extending portion of flange 60 is operatively disposed between a spring retainer 66 and the control lever 10 to urge the control lever 10 toward the upstanding portion of bracket 54 as best shown in FIG. 3. The retainer 66 has a key slot 68 therein which is larger than the outer end of the flange which facilitates installation and removal of spring 64. As shown in FIG. 2 the retainer is locked in position after the end portion 70 has been passed through slot 68 and the retainer has been rotated 90°.

Control lever 10 also passes through a gate 72 of an arched detent plate 74 that is secured at each of its ends to the baseplate 40 by front and rear brackets 76 and 78 respectively. The gate has stops 80, 82, 84, 86 and 88 to positively locate low, drive, neutral, reverse and park positions of the control lever 10 to facilitate transmission operation. The spring biases the lever laterally against the side of the detent plate having the stops 80 through 88. In shifting between predetermined positions from reverse to park for example, the control lever 10 is turned on pivot 58 to clear stop 86 and then turned forwardly with respect to axis 14 until spring 64 urges it into the notch forming stop 88.

Brackets 90 and 92 fastened by screws 94 extend upwardly and are fastened to a supporting bracket 96. This bracket has an upper plate 98 that carries a lens, not shown, with conventional translucent markings which indicate transmission operations such as low, drive, neutral, reverse and park and which are aligned with stops 80 through 88. A suitable electric lamp 100 may be employed to illuminate the markings if desired.

As shown best by FIGS. 2 and 3, pivot pin 58 extending through the flange 56 of bracket 54 supports an upstanding arm 102 which has a detent cover plate 104 secured thereto by screws 106. The detent cover plate extends laterally over the detent plate and is formed with a circular opening through which control lever 10 extends.

As shown in FIGS. 1, 2 and 3 a housing or console 110 is employed to cover the transmission control support elements described above. This console is secured to front and rear brackets 112 and 114 extending from the baseplate by screws 118. The console has an upper opening 120 through which the control lever 10 extends; this opening is sufficiently large to permit unencumbered movement of the lever 10 to the different operating positions as shown in phantom lines in FIGS. 1 and 2.

As shown, cover plate 104 is just below opening 120 to close this opening. The opening 122 adjacent to opening 120 is a sight opening through which the indicia on the lens may be observed.

This invention is not limited to the details of the construction shown and described for purposes of illustrating the invention for other modifications will occur to those skilled in the art.

What is claimed is:

1. A transmission control for a transmission comprising an supporting plate mounted on the floor of a vehicle, a support bracket depending from said supporting plate adjacent to said transmission, a torque-transmitting pivot shaft mounted for limited rotation with respect to a first axis in said support bracket and having opposed ends extending outside of said bracket, connector means for operatively connecting one end of the pivot shaft to said transmission, fastener means mounted on the other end of said pivot shaft for retaining said pivot shaft on said support bracket, a control lever carrier secured to said pivot shaft for rotation therewith, a control lever, pivot means for pivotally mounting said control lever to said carrier so that said control lever can turn said pivot shaft with respect to said first axis and to mount said lever for turning movement in a transverse direction with respect to said first axis, a detent plate having a series of spaced stops thereon, spring means supported on said carrier and contacting said control lever for urging said control lever laterally against said stops, and slot means in said carrier permitting said control lever to be moved laterally away from any one of said stops and subsequently to be moved longitudinally to effect limited rotation of said carrier and said connected control shaft to thereby actuate said connecting means and condition said transmission for a predetermined operation.

2. The transmission shift control defined in claim 1 and further including a housing having an opening therein through which said transmission control lever extends, fastener means connecting said housing to said baseplate, a detent plate cover carried by said carrier and surrounding said transmission control lever for movement therewith, said detent plate cover being supported by said carrier immediately below said opening in said housing to thereby block said opening.

3. A transmission shift control mounted on the floor of a vehicle comprising a manually operable control member movable to any one of a plurality of different positions for conditioning a transmission for different predetermined operations, a support for said control member having a side and spaced first and second extensions, one of said extensions having a laterally extending slot therein through which said control member extends, pivot means mounting said control member to the other of said extensions for turning movement, a baseplate secured to the floor of a vehicle, a support bracket having side and end walls suspended from said baseplate and disposed adjacent to said transmission, a shaft mounted for turning movement in said support bracket adjacent to said transmission, connecting means interiorly of said support bracket for drivingly connecting said support for said control member to said shaft, and linkage means disposed exteriorly of said support bracket for drivingly connecting said transmission control member to a transmission.

4. A control for a power transmission in a vehicle comprising a manually operated lever member movable to a plurality of different positions for conditioning the transmission for different predetermined operations, a carrier for said lever member, support means mounting said carrier and said lever member for limited movement together about a first axis, pivot means pivotally supporting said lever member on said carrier for limiting turning movement about a second axis; said support means comprising a torque transmitting pivot shaft secured to said carrier for rotatably supporting said carrier and said lever member and for transmitting a control force to the transmission, a baseplate secured in the vehicle, and a supporting bracket suspended from said baseplate having an opening therethrough, said pivot shaft having a portion extending through said opening; retainer means for retaining said pivot shaft in said bracket, and torque transmitting means operatively connecting said pivot shaft to the transmission to enable said lever member to condition the transmission for predetermined operations in response to movement of said lever member to predetermined positions.

5. A transmission shift control comprising a manually operated control member movable to any one of a plurality of different predetermined positions for conditioning a transmission for predetermined operations, a carrier for said control member comprising a main body portion with first and second extensions, pivot means securing said control member to said first extension of said carrier for limited turning movement with respect to a first axis, a pivot shaft secured to said carrier for supporting said carrier and said control member for limited rotation together, bracket means for said pivot shaft and said carrier to support said carrier and said control member for limited turning movement together with respect to a second axis, retainer means for retaining said pivot shaft in said bracket means, connecting means for operatively connecting said pivot shaft to a transmission so that predetermined turning movement of said control member changes transmission operation to a predetermined operation, stop means for retaining said control member in any one of said predetermined positions, and yieldable means supported by said second extension of said carrier and contacting said control member for laterally urging said control member into engagement with said stop means.

* * * * *